United States Patent
Bokor et al.

(10) Patent No.: US 9,373,137 B2
(45) Date of Patent: Jun. 21, 2016

(54) MAPPING TRANSACTIONS BETWEEN THE REAL WORLD AND A VIRTUAL WORLD

(75) Inventors: Brian Ronald Bokor, Raleigh, NC (US); Andrew Bryan Smith, Morrisville, NC (US); Peter Frederick Haggar, Raleigh, NC (US); Daniel Edward House, Raleigh, NC (US); William Bruce Nicol, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1882 days.

(21) Appl. No.: 12/419,324

(22) Filed: Apr. 7, 2009

(65) Prior Publication Data
US 2010/0257071 A1    Oct. 7, 2010

(51) Int. Cl.
G06Q 30/00    (2012.01)
*G06Q 30/06*    (2012.01)
*G06Q 10/08*    (2012.01)
G06Q 20/00    (2012.01)

(52) U.S. Cl.
CPC .......... *G06Q 30/0603* (2013.01); *G06Q 10/087* (2013.01); *G06Q 20/00* (2013.01)

(58) Field of Classification Search
CPC .. G06Q 10/087; G06Q 20/00; G06Q 30/0643
USPC ........ 705/1, 28, 27.2; 702/188; 707/102, 949; 345/568, 473; 718/1; 463/31; 715/706
See application file for complete search history.

(56) References Cited

U.S. PATENT DOCUMENTS

| | | | |
|---|---|---|---|
| 5,892,900 A | 4/1999 | Ginter et al. |
| 5,926,179 A | 7/1999 | Matsuda et al. |
| 6,035,423 A | 3/2000 | Hodges et al. |
| 6,119,229 A | 9/2000 | Martinez et al. |
| 6,151,643 A | 11/2000 | Cheng et al. |
| 6,414,679 B1 | 7/2002 | Miodonski et al. |
| 6,912,565 B1 | 6/2005 | Powers et al. |
| 7,249,139 B2 | 7/2007 | Chuah et al. |
| 7,280,991 B1 | 10/2007 | Beams et al. |
| 7,412,422 B2 | 8/2008 | Shiloh |
| 7,469,217 B2 | 12/2008 | Kidd et al. |
| 7,519,547 B2 | 4/2009 | Rodriguez et al. |
| 7,568,017 B2 | 7/2009 | Shah et al. |

(Continued)

OTHER PUBLICATIONS

Bokor, Brian R., et al., Non-Final Office Action dated Jul. 14, 2011 for U.S. Appl. No. 12/264,982.

(Continued)

*Primary Examiner* — Hunter Wilder
(74) *Attorney, Agent, or Firm* — Moore & Van Allen PLLC

(57) ABSTRACT

A method for mapping transactions between a real world and a virtual world may include receiving information associated with a real world item at a virtual business object (VBO) controller. Information associated with a user is received at the VBO controller. In response to receiving by the VBO controller a decision to buy the real world item, the VBO controller generates a VBO, which includes the information associated with the real world item. In response to receiving at the VBO controller a decision not to buy the real world item, the VBO controller generates a VBO light, which includes the information associated with the real world item. Either the generated VBO or the VBO light is transmitted to a VBO inventory database associated with the user based on the user's information.

25 Claims, 8 Drawing Sheets

(56) References Cited

U.S. PATENT DOCUMENTS

| | | |
|---|---|---|
| 7,660,778 B1 | 2/2010 | Nicols |
| 2001/0020231 A1 | 9/2001 | Perri, III et al. |
| 2002/0169726 A1 | 11/2002 | Taylor et al. |
| 2003/0014423 A1* | 1/2003 | Chuah et al. .................. 707/102 |
| 2003/0028451 A1 | 2/2003 | Ananian |
| 2003/0061104 A1 | 3/2003 | Thomson et al. |
| 2003/0061171 A1 | 3/2003 | Gilbert et al. |
| 2003/0101025 A1* | 5/2003 | Shah et al. .................. 702/188 |
| 2003/0227392 A1 | 12/2003 | Ebert et al. |
| 2004/0103022 A1 | 5/2004 | Chilcoat, III et al. |
| 2004/0111327 A1 | 6/2004 | Kidd et al. |
| 2005/0131768 A1 | 6/2005 | Rodriguez et al. |
| 2005/0216346 A1 | 9/2005 | Kusumoto et al. |
| 2005/0234781 A1 | 10/2005 | Morgenstern et al. |
| 2006/0212355 A1 | 9/2006 | Teague et al. |
| 2007/0073582 A1 | 3/2007 | Jung et al. |
| 2007/0087822 A1* | 4/2007 | Van Luchene .................. 463/25 |
| 2007/0214030 A1 | 9/2007 | Shear et al. |
| 2007/0268299 A1 | 11/2007 | Jung et al. |
| 2008/0004119 A1 | 1/2008 | Van Luchene et al. |
| 2008/0207327 A1 | 8/2008 | Van Luchene et al. |
| 2009/0070228 A1 | 3/2009 | Ronen |
| 2009/0083051 A1* | 3/2009 | Bokor et al. ....................... 705/1 |
| 2009/0083052 A1 | 3/2009 | Bokor et al. |
| 2009/0265761 A1 | 10/2009 | Evanitsky |
| 2010/0082456 A1* | 4/2010 | Chung ........................... 705/27 |
| 2010/0115425 A1 | 5/2010 | Bokor et al. |

OTHER PUBLICATIONS

Bokor, Brian R., et al., Final Office Action dated Dec. 6, 2011 for U.S. Appl. No. 12/264,982.

Bokor, Brian R., et al., Non-Final Office Action dated Jun. 27, 2012 for U.S. Appl. No. 12/264,982.

Second Life, "SecondLife," http://web.archive.org/web/20060101031416/http://secondlife.com/, dated Sep. 1, 2010, 26 pages.

* cited by examiner

MAPPING TRANSACTIONS BETWEEN THE REAL WORLD AND A VIRTUAL WORLD

BACKGROUND OF THE INVENTION

Embodiments of the present invention relate to virtual world simulations of the real-world or real-life or a virtual world and the like, and more particularly to a system and method for mapping at least one real world item to a virtual world.

Computer simulations such as Second Life™ or similar simulations present a virtual world which allows users or players to be represented by characters known as avatars. Second Life is a trademark of Linden Research, Inc. in the United States, other countries or both. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another.

Currently, there is no way to associate or map information about a real world item to the user's avatar's virtual world inventory or to another inventory associated with a user. This can have significant drawbacks. For example, if the user wanted to develop an inventory of real world items, the user must try to emulate each item. Further, even if the user develops an inventory, keeping the inventory updated and accessing information about each real world item can be difficult, cumbersome and time consuming.

BRIEF SUMMARY OF THE INVENTION

In accordance with an aspect of the present invention, a method for mapping transactions between a real world and a virtual world may include receiving information associated with a real world item at a virtual business object (VBO) controller. Information associated with a user may be received at the VBO controller. In response to receiving by the VBO controller a decision to buy the real world item, the VBO controller may generate a VBO, which includes the information associated with the real world item. In response to receiving at the VBO controller a decision not to buy the real world item, the VBO controller may generate a VBO light, which includes the information associated with the real world item. Either the generated VBO or the VBO light may be transmitted to a VBO inventory database associated with the user based on the user's information.

In accordance with another aspect of the present invention, a system for mapping transactions between a real world and a virtual world may include a processor and a VBO controller operable on the processor. The VBO controller may include at least one module to receive information associated with a real world item and a user. In response to a decision to buy the real world item, a VBO may be generated including the information associated with the real world item. In response to a decision not to buy the real world item, a VBO light may be generated including the information associated with the real world item. Either the VBO or the VBO light may be transmitted to a VBO inventory database associated with the user based on the user's information.

In accordance with another aspect of the present invention, a computer readable storage medium may have computer usable program code embodied therewith for mapping transactions between a real world and a virtual world. The computer readable storage medium may include computer usable program code configured to receive information associated with a real world item at a virtual business object (VBO) controller on a computer system. The computer readable storage medium may also include computer usable program code configured to receive information associated with a user at the VBO controller. The computer readable storage medium may further include computer usable program code configured to generate a VBO including the information associated with the real world item in response to a decision to buy the real world item. The computer readable storage medium may yet further include computer usable program code configured to generate a VBO light including the information associated with real world item in response to a decision not to buy the real world item. The computer readable storage medium may still yet further include computer usable program code configured to transmit either the VBO or the VBO light to an inventory associated with the user based on the user's information.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
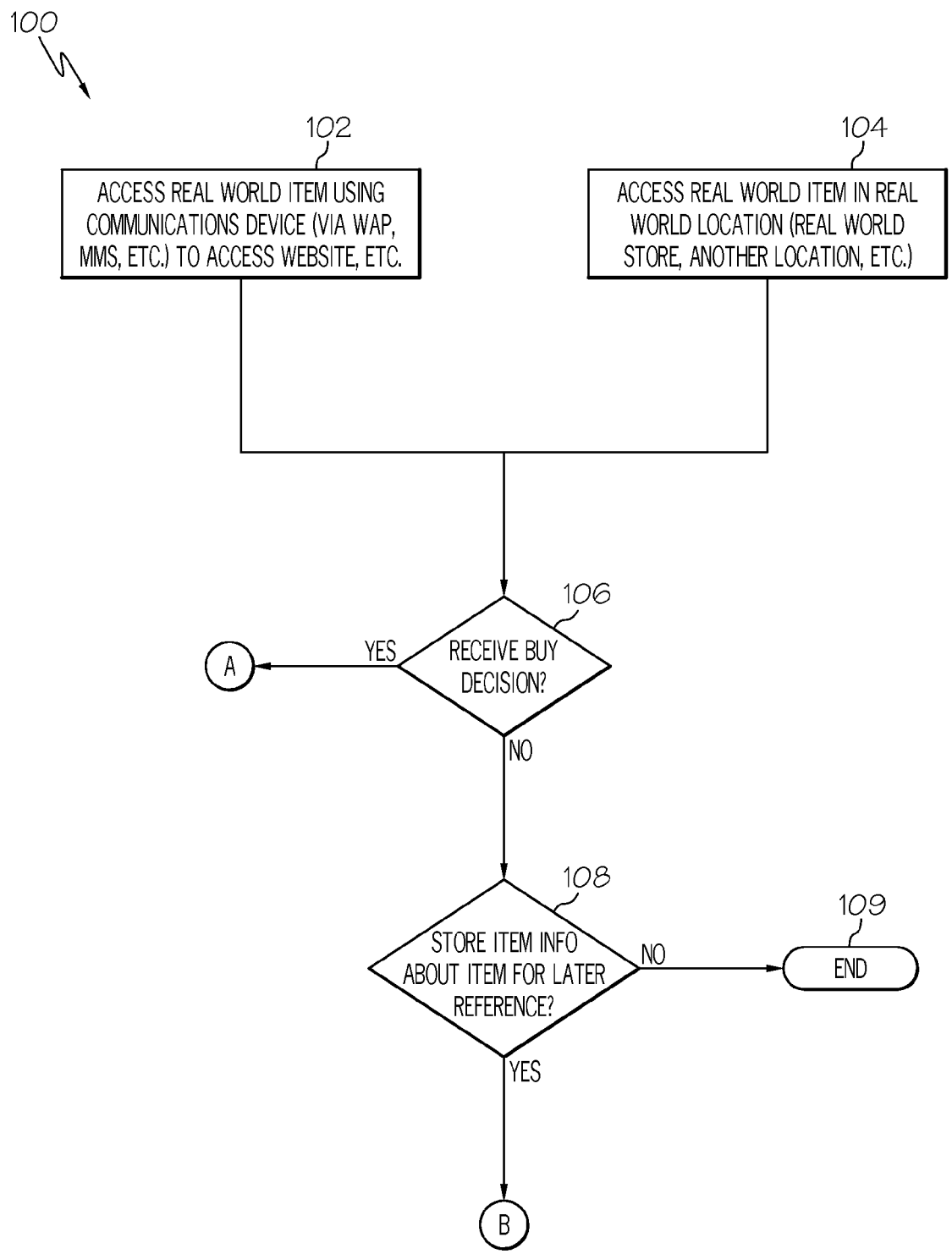
FIGS. 1A, 1B, 1C, 1D and 1E (collectively FIG. 1) is a flow chart of an example of a method for mapping transactions between the real world and a virtual world in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIGS. 1A, 1B, 1C, 1D and 1E (collectively FIG. 1) illustrates a flow chart of an example of a method 100 for mapping transactions between the real world and a virtual world in accordance with an embodiment of the present invention. Turning first to FIG. 1A, in blocks 102 and 104, a user accesses a real world item using a communications device or in person, respectively. The real world item may be any item which exists in the real world, such as a piece of merchandise in a retail store, an item for sale at another location, an object for rent, or any other object in the real world. It should be understood that the real world may be any location which is outside of the virtual world such as reality, augmented reality and the like.

Nonetheless, in block 102, the real world item may be accessed using a communications device via any protocol such a WAP, MMS, and the like. The real world item may be accessed via any manner such as via a website, e-mail, text messages, or any other communications path. For example, a real world item may be accessed by viewing information about the real world item over a store's website using a computer.

In block 104, the real world item may be accessed in person at a real world location, such as a real world store, a retail or advertising booth, a trade show, or any other location in the real world. For example, a digital camera may be viewed at a store in a shopping mall.

In decision block 106, a determination is made as to whether or not a buy decision has been received. If a buy decision has been received, the method may continue to block 110, which is described later with regard to FIG. 1B. If no buy decision has been received, method 100 may continue to decision block 108.

In decision block 108, a determination is made as to whether the user would like to store item information about the real world item for later reference, access or use. If the user decides not to store item information, then the method 100 may be terminated, as shown in block 109. Conversely, if the user decides to store item information, the method 100 may proceed to block 132, which is described later with regard to FIG. 1C.

Figure 1B:
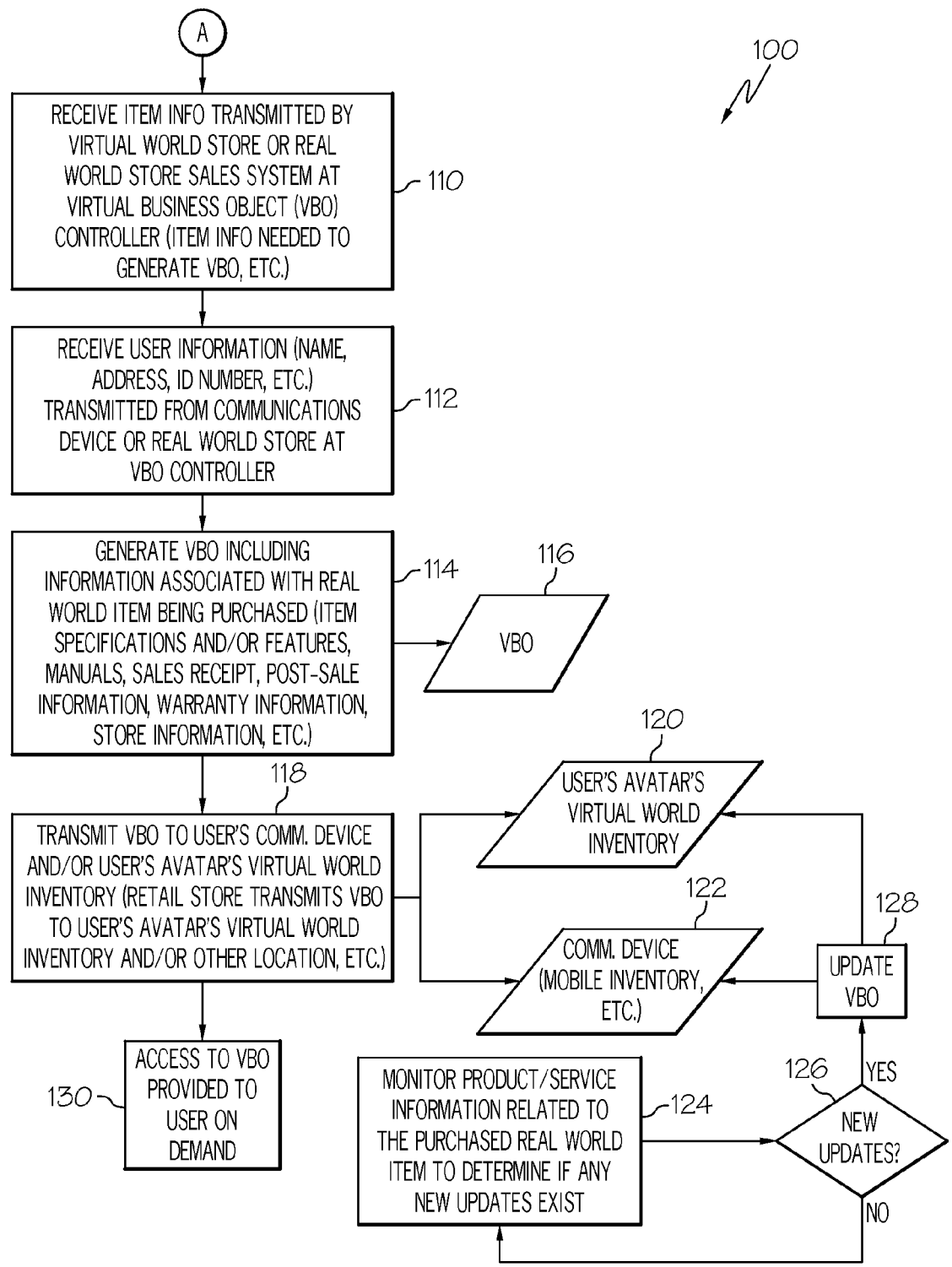

As previously described, if a buy decision has been received in block 106, the method 100 may advance to block 110 in FIG. 1B. In block 110, item information may be transmitted by a virtual world store or real world store sales system to a virtual business object controller. The item information received may be any information associated with the real world item that is needed to generate a virtual business object (VBO). For example, the item information may be specific information associated with the item, such as item identification, item classification and/or features, information contained in the item's manual, sales receipt information, post-sale information, warranty information, store information or any other information associated with the item. The item information may be obtained by the virtual world store or real world store sales system by any manner, such as by capturing item information at a scanner, a checkout counter or kiosk, inputting the item information, and the like. In one embodiment, the item information may be obtained through a virtual world store and thereafter transmitted to the virtual business object controller. It should be understood that the item information may be obtained by any manner and transmitted to the VBO controller in any manner.

In block 112, user information may be transmitted from a communications device or real world store to a VBO controller. The user information may be any information associated with the user, such as the user name, address, user identifier or any other information to identify the user. The user information may be obtained in any manner such as the user inputting user information into a logon screen, the user's IP address being logged, receiving the user's cell phone number, receiving user information from the user's credit card information, or any other information associated with the user. The user information is captured by a communication's device, real world store or any other device or location which is capable of transmitting the user information to the VBO controller. The communications device may be any device such as a cell phone, a computer, personal digital assistant (PDA), scanner at a real world store, kiosk at the real world store, real world store computer system, or any other device which is capable of transmitting user information to the VBO controller.

In block 114, the VBO 116 is generated. The VBO 116 may include information associated with a purchased real world item, such as item specifications and/or features, manuals, sales receipt, post-sale information, warranty information, store information, and any other information associated with the real world item. The real world item VBO may be represented in the virtual world as a virtual world object, such as a VBO. Such virtual world representation allows the user's avatar to use the real world item via the VBO in the virtual world similar to the user being able to use the real world item in the real world. Thus, the purchased real world item is mapped directly to the user's avatar and/or an inventory associated with the user in the virtual world.

In block 118, the VBO 116 is transmitted to the user's communication device 122 and/or the user's avatar's virtual world inventory 120. The VBO 116 may be transmitted by any entity to any inventory associated with the user. For example, a retail store may transmit the VBO 116 to the user's avatar's virtual world inventory 120, the user's communication device 122 and/or other location associated with the user. The VBO 116 may be transmitted to the user using the user identification information, which was previously described with respect to block 112.

After receiving the VBO 116, the user's avatar's virtual world inventory 120 and/or the communication's device 122 receives the VBO 116 and indexes the VBO 116 accordingly for later reference or access. As previously mentioned, the user's communication device 122 may be any communication device such as a cell phone, PDA, laptop and the like, which has a mobile inventory resident on the communication device 122 or accessible through the communications device 122.

In block 130, access to the VBO 116 may be provided to the user on demand. The user or other entity may access the VBO 116 through the user's avatar's virtual world inventory 120, the user's communication device 122 and/or any other inventory or device. Access to the VBO 116 may include retrieving any information associated with the real world item, as previously described in block 114, such as item specifications and/or features, manuals, sales receipt, post-sale information, warranty information, store information and/or any other real world item information.

In block 124, product and/or service information related to the purchased real world item may be monitored to determine if any new updates exist. New updates regarding the product and/or service information of the real world item may include information such as warranty information, updated specifications and/or features, edits to product manuals, advertising opportunities, and the like. These updates may be checked after the real world item has been purchased so that the VBOs 116 in the user's inventory 120, 122 may be continuously updated to have the latest information regarding each respective purchased real world item.

In decision block 126, a determination may be made if any new updates exist. If there are no new updates, the method 100 may return back to block 124 to continuously monitor product and/or service information related to the purchased real world item. If new updates are determined to exist in block 126, the method 100 may proceed to block 128 where the VBO 116 is then updated in the user's avatar's virtual world inventory 120, the user's communications device 122, and/or any other inventory or device.

As previously mentioned with regard to FIG. 1A, in decision block 106, if the user decides not to buy the real world item, the method may continue to decision block 108 of FIG. 1A where a determination is made as to whether the user would like to store item information about the real world item for later reference or access. If so, the method may continue to block 132 of FIG. 1C.

Figure 1C:
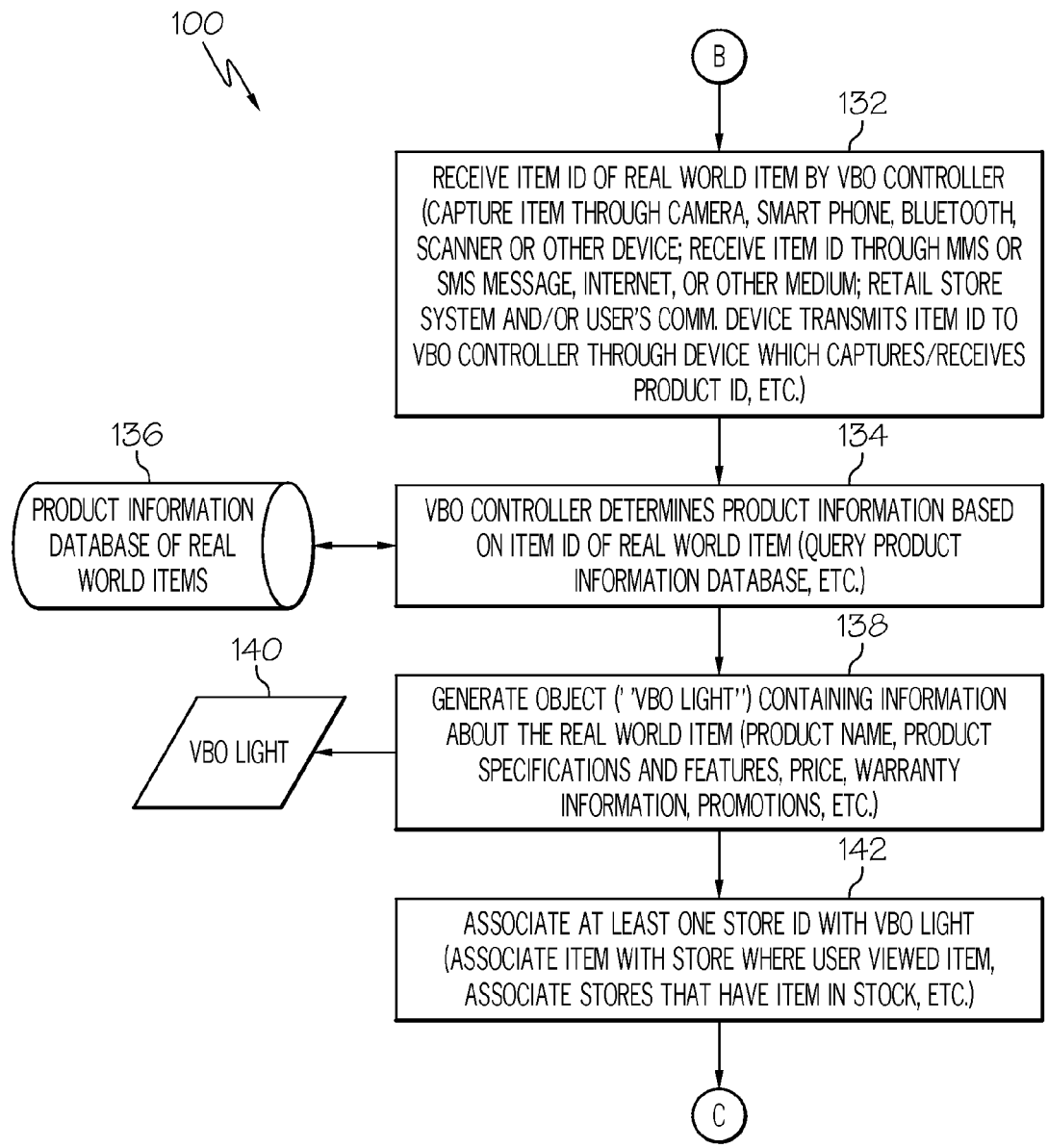

In block 132 of FIG. 1C, identification (ID) of the real world item is received by the VBO controller. The real world item ID may be obtained in any manner. For example, the item ID may be captured through a camera, smart phone, blue tooth, scanner or other computing device. By way of another example, the item ID may be received through a multi-media messaging service (MMS) message, the Internet or other medium. In another embodiment, the retail store system and/or the user's communication device transmits the item ID to the VBO controller through a device which captures and receives the item ID. It should be understood that the item ID may be captured and transmitted to the VBO controller via any other manner than those described above.

In block 134, the VBO controller may determine product information based on the item ID of the real world item. In one embodiment, the VBO controller may query real world item information from a database of real world items 136. The database of real world items 136 may be a repository having information associated with a plurality of real world items. It should be understood that the real world item information may be determined from any other manner based on receiving the real world item ID. For example, the VBO controller queries real world item information from other databases, such as retail store databases or any other database having information associated with the real world items.

In block 138, the VBO controller may generate an object containing information about the real world item which may be referred to as "VBO Light" 140. The VBO light may be generated or created by the VBO controller in response to receiving at the VBO controller a decision by a user or prospective purchaser in block 106 not to buy the real world item. The information contained in the VBO Light 140 may include any information regarding the real world item such as the product name, specifications, and/or features, price of the real world item, warranty options, promotions, advertising, and any other information regarding the real world item.

In block 142, at least one store may be associated with the VBO Light 140. Any store may be associated with the VBO Light 140, such as the store where the user viewed the real world item, the store that has the item in stock, one or more stores closest in proximity to the user, and/or any other store associated with the real world item and/or user.

Figure 1D:
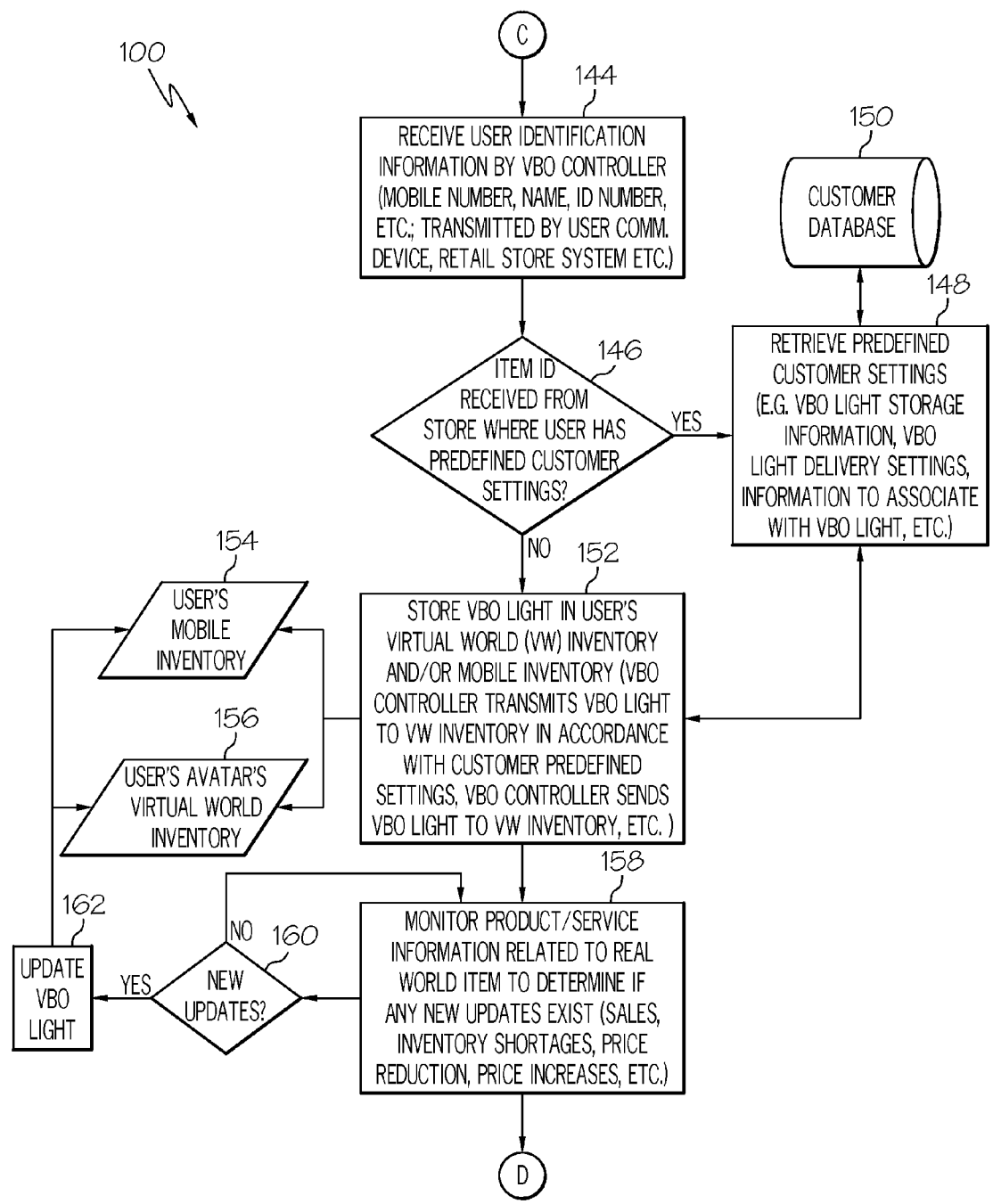

Referring now to FIG. 1D, in block 144, user ID information may be received by the VBO controller. The user ID information may include a number of the user's mobile communications device, the user's name, the user's address and/or any other information associated with the user. The user ID information may be transmitted to the VBO controller by any device such as the user's communication device, a device associated with a retail store system, for example a cash register, scanner, checkout scanner or the like, a virtual world system or similar device.

In decision block 146, a determination is made as to whether the item ID was received from a store or other location where the user has predefined customer settings. The predefined customer settings may be any settings specifically associated with the customer related to the creation and delivery of the VBO Light, such as VBO Light storage information, VBO Light delivery settings, specific information to associate with the VBO Light, and/or any other settings specifically predefined by the customer. In block 148, if the item ID was received from a store where the user has predefined customer settings, the predefined customer settings may be retrieved from a customer database 150 or other location or storage medium. If, however, no predefined customer settings exist for the user, the method 100 may proceed to block 152.

In block 152, the VBO Light may be stored in the user's avatar's virtual world inventory 156, user's mobile inventory 154 and/or other inventory or storage means associated with the user. The user's avatar's virtual world inventory 156 and/or the user's mobile inventory 154 may be similar to the user's avatar's virtual world inventory 120 and the inventory associated with the user's communications device 122, which were previously discussed with respect to FIG. 1B. Nonetheless, the VBO controller transmits the VBO Light to the user's inventory 154, 156 in accordance with the customer's predefined settings, if any, as previously described in 148.

In block 158, after the VBO Light is stored in the user's inventory 154, 156, product and/or service information related to the real world item may be monitored to determine if any new updates exist as illustrated in block 158. The product or service information may relate to sales, inventory shortages, price reductions, price increases or any other information related to the real world item.

In block 160, a determination may be made as to whether any new updates exist. If no new updates exist, then method 100 may proceed back to block 158 to continuously monitor product and/or service information related to the real world item. If new updates are determined to exist in block 160, the method 100 may proceed to block 162.

In block 162, one or more VBO Lights may be updated in the user's mobile inventory 154, the user's avatar's virtual world inventory 156 or any other inventory associated with the user.

Figure 1E:
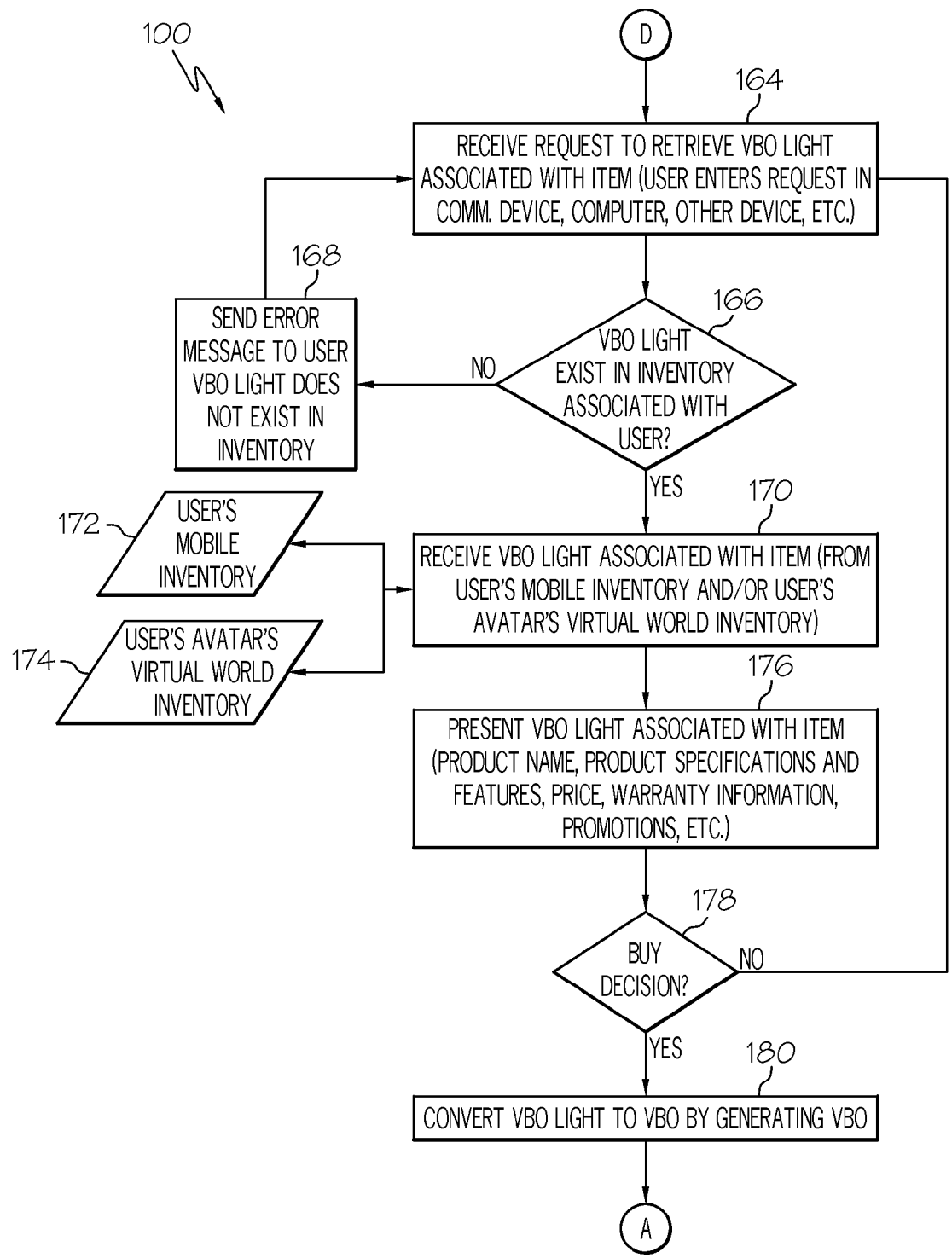

Referring now to FIG. 1E, in block 164, if the user decides to retrieve information associated with a previously viewed real world item, the user may request to retrieve VBO Light information associated with the real world item. The user may enter such request in the user's communication device, via a computer or other device which communicates with the user's avatar's virtual world inventory, or via another device which is capable of determining whether the requested VBO Light exists.

In block 166, a determination may be made as to whether the requested VBO Light exists in an inventory associated with user. If the VBO Light is determined to not exist in the user's inventory, then an error message may be sent to the user indicating that the VBO Light does not exist in the inventory, as illustrated in block 168. The method 100 may continue back to block 164 so the user can request information associated with another VBO Light. If the requested VBO Light does exist in the user's inventory, as determined by decision block 166, then the method 100 may proceed to block 170.

In block 170, the VBO Light may be retrieved from the user's mobile inventory 172, the user's avatar's virtual world inventory 174 and/or other inventory associated with the user. The user's mobile inventory 172 and/or the user's avatar's virtual world inventory 174 may be similar to or the same as the user's inventories 120, 122 and 154, 156, previously discussed with respect to FIGS. 1B and 1C. The VBO Light may be retrieved from the user's inventories via the VBO controller or other device for presentation of the VBO Light information to the user.

In block 176, the VBO Light information may be presented to the user. As previously mentioned, the VBO Light information may relate to information associated with the real world item, such as the item name, item specifications and features, item price, warranty information associated with the item, and/or any other information associated with the real world item. Thus, any of such information may be presented to the user when requested. In one embodiment, the user may request a portion or all of the VBO Light information through a graphical user interface.

It should be understood that when retrieving and presenting VBO Light information to the user, the user does not have to be proximate to the real world item and may retrieve VBO Light information at any location and at any time.

In decision block 178, the user may make a decision whether or not to buy the real world item associated with the retrieved VBO Light information. If the user does not decide to buy the real world item, the method 100 may continue back to block 164 or alternatively terminate. However, if the user does decide to buy the real world item, the method 100 may continue to block 180 where the VBO Light may be converted to a VBO. Converting the VBO Light to a VBO may be a process similar to that previously described in FIG. 1B starting at block 110.

Figure 2:
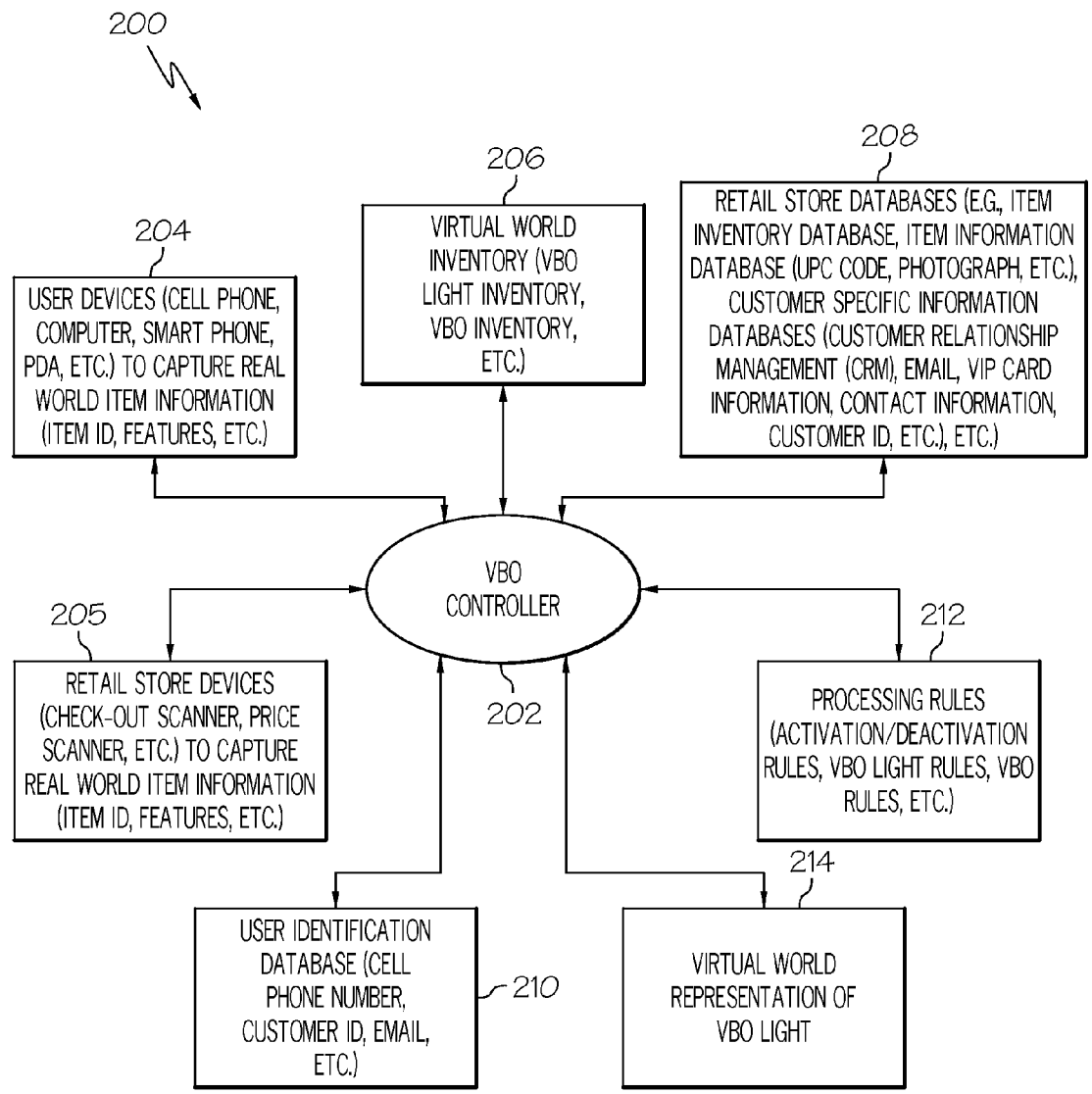
FIG. 2 is a block schematic diagram of an example of a system for mapping transactions between the real world and a virtual world in accordance with an embodiment of the present invention.

FIG. 2 is a block schematic diagram of an example of a system 200 for mapping transactions between the real world and a virtual world in accordance with an embodiment of the present invention. The system 200 may include a VBO controller 202. As described in more detail herein, the VBO controller may be module stored on a computer system, server or other device and may be operable on the computer system or server to perform the functions as described herein. The VBO controller 202 may communicate with one or more devices to receive VBO and/or VBO light information and create a VBO and/or VBO Light. For example, the VBO controller 202 may communicate with user devices 204 and/or retail store devices 205 in creating a VBO and/or VBO Light. The user devices 204 may include a cell phone, computer, smart phone, PDA, and may be used to capture real world item information, such as item ID, item features and the like, as previously discussed with regard to FIG. 1. The retail store devices 205 may include a check-out scanner, price scanner or any other device which allows the retail store to capture real world item information.

The VBO controller may communicate with the virtual world inventory 206 to transmit and store the VBO and/or VBO Light into the virtual world inventory 206 associated with the user, as previously described in FIG. 1. The user's virtual world inventory 206 may, thus, include an inventory of VBO Lights, an inventory of VBOs and/or other inventories. The VBO controller also communicates with the virtual world inventory 206 to retrieve information associated with a VBO and/or VBO Light to present to the user. The virtual world inventory 206 may be similar to the user's avatar's virtual world inventory 120, 156, 174, previously described in FIG. 1.

The VBO controller 202 may also communicate with retail store databases 208. The retail store databases 208 may include an item inventory database, an item information database, customer specific information databases or any other database. The item inventory database may relate to a store inventory having information associated with the real world item. The item information database may include various data associated with the real world item, such as the UPC code, item label, photographs or images of the item, or any other information which may be used to determine the real world item information. The customer specific databases may include customer relationship management (see CRM), email, VIP card information, contact information, customer ID and/or any other information specific to the customers of the retail store. It should be understood that any other database which is associated with a real world store may communicate with the VBO controller 202 to receive information specific to the real world item.

The VBO controller 202 may also communicate with a user identification database 210. The VBO controller 202 may communicate with the user identification database 210 to retrieve various information about the user in order for the VBO controller 202 to transmit and/or store a VBO and/or VBO Light in the user's inventory. The user identification database 210 may include various entries such as the user's name, cell phone number of the user, customer ID of the user, user's e-mail address, user's logon information or any other information which may be used to identify a user.

The VBO controller 202 may also access certain processing rules 212 in processing the VBO Light and/or VBO. The processing rules 212 may include activation or deactivation rules, VBO rules, VBO Light rules or any other rules which may define processing of the VBO or VBO Light.

The VBO controller 202 also controls the virtual representation 214 of VBO and VBO Light. The virtual representation 214 of the VBO and VBO Light may include how the VBO and VBO Light information is presented to the user and how the VBO and VBO Light is represented in the user's inventory and/or in the virtual world.

Figure 3:
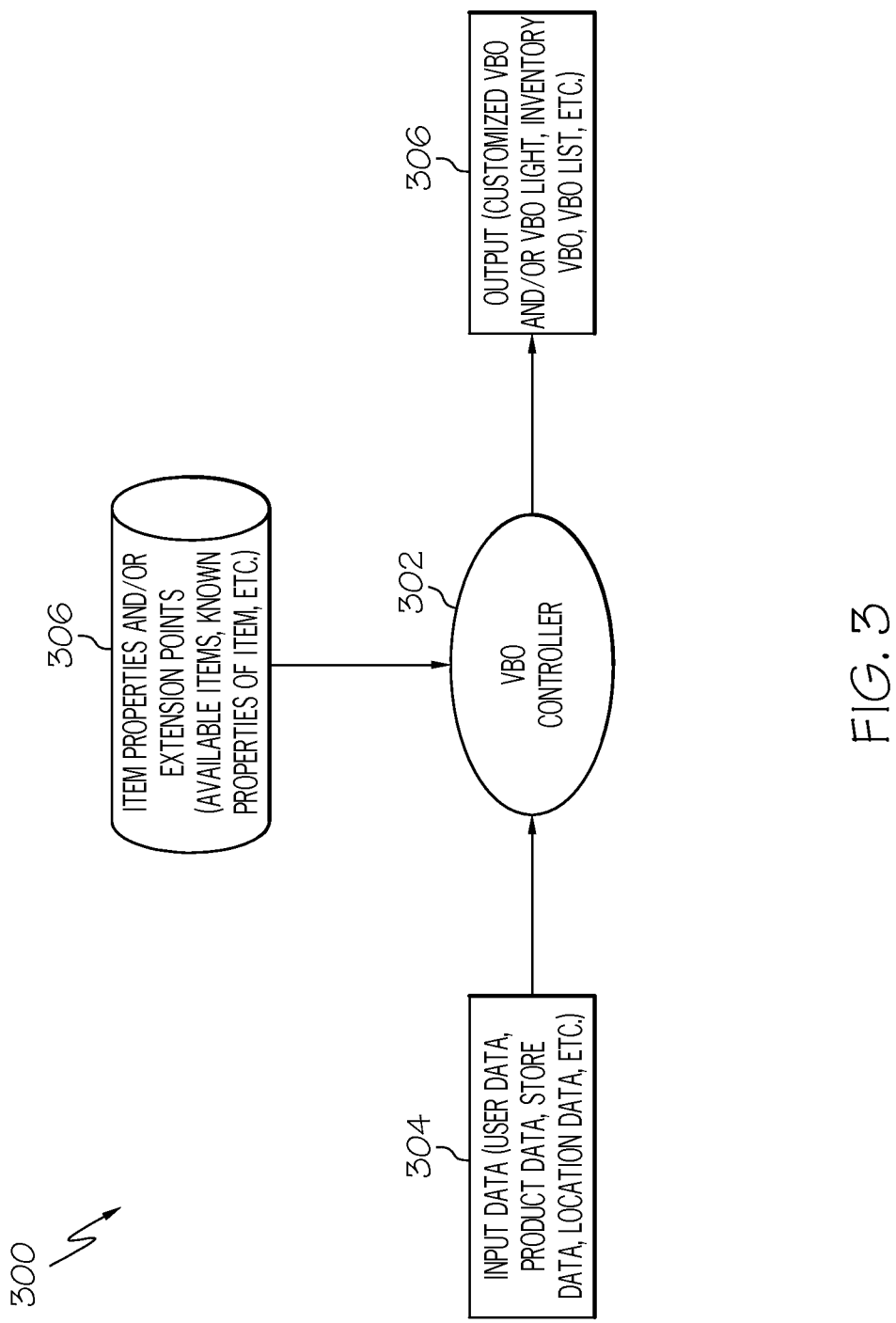
FIG. 3 is a flow chart of an example of a method for mapping transactions between the real world and a virtual world in accordance with another embodiment of the present invention.

FIG. 3 is a flow chart of an example of a method 300 for mapping transactions between the real world and a virtual world in accordance with another embodiment of the present invention. As illustrated, the VBO controller 302 receives input data 304 and creates an output 306 based on the input data 304. The input data 304 may include any data associated with the user, real world item, store associated with the real world item, and/or any other data which may be used to create and transmit the VBO and/or VBO Light to the user. The output 306 may be any customized VBO and/or VBO Light, VBO list and the like. In creating the output 306 by the VBO controller 302, item properties and/or extension points 308 may be applied to the input data 304. The item properties and/or extension points 308 may relate to: real world items that are available for purchase, real world items which are available to the public, known and available properties of the real world items, settings pre-defined by the manufacturer or any other properties which may be applied to the input data to create the output 306.

Figure 4:
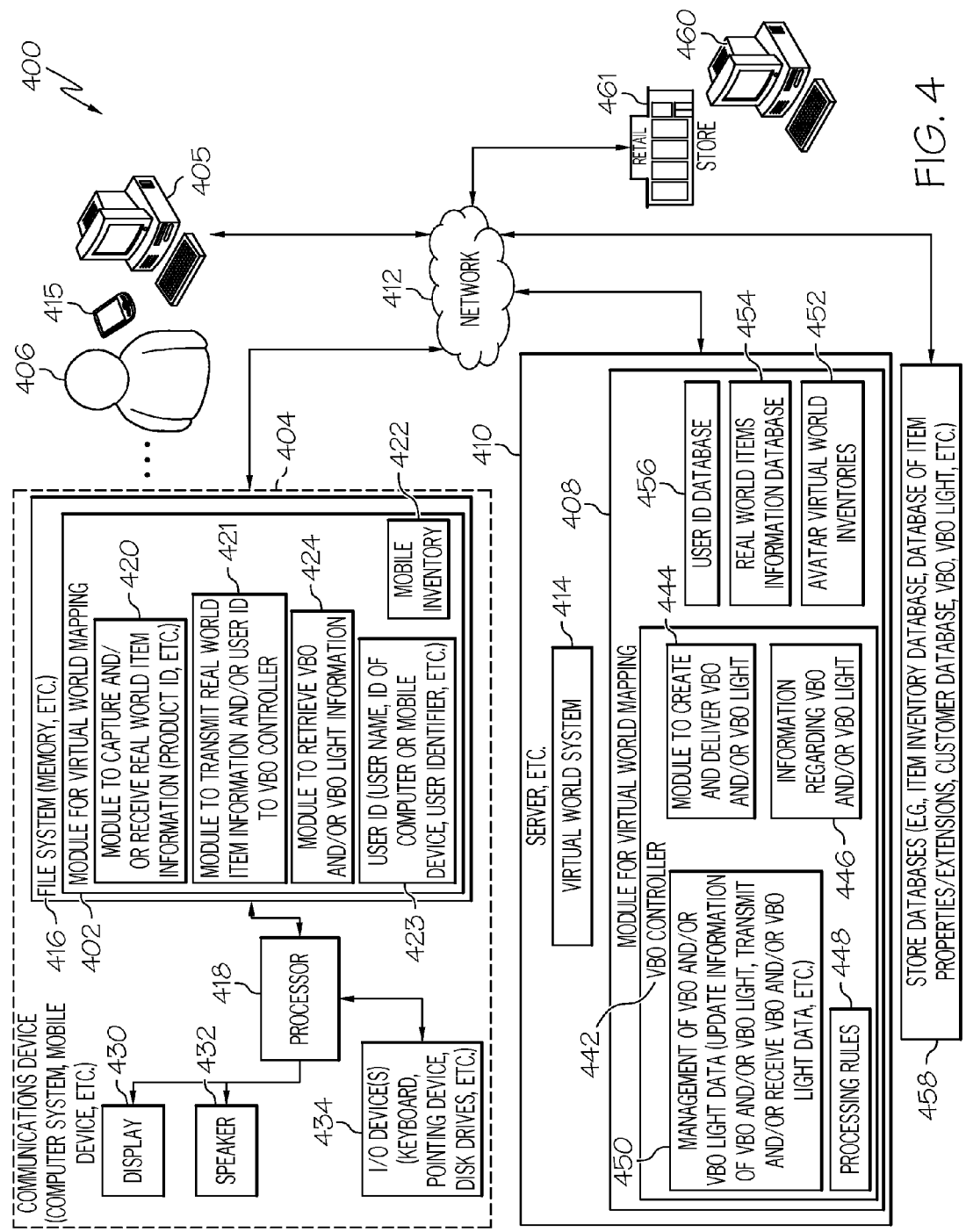
FIG. 4 is a block schematic diagram of an example of a system for mapping transactions between the real world and a virtual world in accordance with another embodiment of the present invention.

FIG. 4 is a block schematic diagram of an example of a system 400 for mapping transactions between the real world and a virtual world in accordance with another embodiment of the present invention. The system 400 may include a module for a virtual world mapping 402 operable on a communications device 404, or similar device of a user 406 or client. Alternatively, or in addition to the virtual world mapping module 402 on the user's communications device 404 or client, the system 400 may include a server virtual world mapping module 408 operable on a server 410 and accessible by the user 406 or client 404 via a network 412. The methods 100, 300 may be embodied in or performed by the virtual world mapping module 402 and/or the server virtual world mapping module 408. In one embodiment, the methods 100, 300 may be wholly performed by the virtual world mapping module 402. In another embodiment of the invention, the methods 100, 300 may be wholly performed by the server virtual world mapping module 408. In a further embodiment of the present invention, some of the features or functions of the methods 100, 300 may be performed by the virtual world mapping module 402 on the user's communications device 404 or client and other features or functions of the methods 100, 300 may be performed on the server virtual world mapping module 408.

A virtual world simulation system 414 may be operable on the server 410 and may be accessible by a plurality of users 406 or participants using an Internet browser on their respective communications devices 404 or clients. The virtual world simulation system 414 may be Second Life™ or a similar virtual world system. The virtual world mapping modules 402 and 408 may be part of the virtual world simulation system 414 or may be separate applications or modules that interface with the virtual world simulation system 414. The network 412 may be the Internet, a private network or other network.

Each communications device 404 may be similar to the exemplary communications device 404 and associated components illustrated in FIG. 4. Examples of the communications device 404 may include a computer 405 or a mobile communications device 415, such as a cellular phone, PDA, or other wireless devices.

The virtual world mapping module 402 and/or 408 may be a self contained system with embedded logic, decision making, state based operations and other functions that may operate in conjunction with a virtual world simulation, such as Second Life™. The self contained system may allow businesses, individuals, services, locations, and the like in the virtual world to interact.

The virtual world mapping module 402 may be stored on a file system 416 or memory of the communications device 404. The virtual world mapping module 402 may be accessed from the file system 416 and run on a processor 418 associated with the communications device 404.

The virtual world mapping module 402 may include a module to capture and/or receive real world item information 420 (hereinafter "item information module"). The item information module 420 allows the user or real world store system to capture data or information associated with the real world item, such as item ID, item features and specifications, and the like. Such item information may be captured by the communications device 404 or other means, transmitted to the VBO controller 442, and transmitted to the item information module 420 by the VBO controller 442. The item information module 420 may be accessed or activated whenever the user or other entity desires to capture information about the real world item and may call other modules, such as a module to transmit real world item information and/or user ID to the VBO controller 442, as described below.

The virtual world mapping module 402 may also include an information transmission module 421 to transmit real world item information and/or user ID to the VBO controller 442. The information transmission module 421 may receive and transmit real world information from the item information module 420 to a mobile inventory 422 on the communications device 404 or to one or more modules located on the server virtual world mapping module 408. Additionally, the information transmission module 421 may transmit other information to modules within the user's communications device 404 and modules within the server virtual world mapping module 408. For example, the information transmission module 421 may transmit the user ID information 423 from the user's communications device 404 to the VBO controller 442 of the server virtual world mapping module 408.

The virtual world mapping module 402 may also include a mobile inventory 422. The mobile inventory 422 may include one or more VBOs and/or VBO Lights that were previously created and/or configured by the VBO controller 442. After the VBO controller 442 creates or generates a VBO and/or VBO Light, the VBO and/or VBO Light may be stored on the communications device 404 at the mobile inventory 422. The mobile inventory 422 may be activated or accessed at any time by the user through the user's communications device 404 to access and/or store at least one VBO and/or VBO Light. The VBOs and VBO Lights may also be stored at a location or database on the network 412, such for example a database 458.

The virtual world mapping module 402 may also store the user ID information 423 on the communications device 404, including user name, ID of a computer 405 or mobile device 415, user identifier and/or other information to identify the user. The user's ID 423 may be stored on the communications device 404, server 410, system 460 associated with a retail store 461, or other device and may be accessed at any time by the information transmission module 421 or other module.

The user's communications device 404 may include a display 430 and a speaker 432 or speaker system. The display 430 may present the virtual world, the user's avatar's inventory and the mobile inventory 422 to the user 406, as described herein. Any GUIs associated with the virtual world mapping, VBO and/or VBO Light may also be presented on the display 430. The speaker 432 may present any voice or other auditory signals or information to the user 406.

The user's communications device 404 may also include one or more input devices, output devices or combination input and output device, collectively I/O devices 434. The I/O devices 434 may include a keyboard, computer pointing device, scanner, camera, or similar means to control operation in the virtual world and capture information related to the real world items, as described herein. The I/O devices 434 may also include disk drives or devices for reading computer media including computer-readable or computer-operable instructions.

The server virtual world mapping module 408 may include the VBO controller 442. As previously discussed in FIGS. 1-3, the VBO controller 442 receives input data associated with a real world item and creates and transmits a VBO and/or VBO Light to the user's inventory. The VBO controller 442 interacts with the virtual world mapping module 402 on the user's computer or communications device 404 to receive and/or transmit various information associated with a VBO and/or VBO Light. The VBO controller 442 also interacts with modules on the server virtual world mapping module 408. Various modules may be included in the VBO controller 442, as is described below.

The VBO controller 442 may include a module 444 to create and deliver VBO and/or VBO Light ("VBO creation and delivery module 444"). The VBO creation and delivery module 444 may receive information about a real world item and generate the VBO and/or VBO Light based thereon. The VBO controller 442 may retrieve information associated with the VBO and/or VBO Light from one or more sources located on the server 410, such as the real world items information database 454, or other sources, such as store databases 458, a system 460 of a retail store 461, and/or other locations. After creation of the VBO and/or VBO Light, the VBO creation and delivery module 444 may transmit the VBO and/or VBO Light to the mobile inventory 422 of the user's communications device 404 and/or the user's avatar virtual world inventory located in the avatar virtual world inventories 452. The VBO controller 442 may create and transmit the VBO and/or VBO Light according to processing rules 448.

The VBO controller 442 may also include information regarding the VBO and/or VBO Light 446. The VBO and/or VBO Light information 446 may be created by the VBO controller 442 and stored within the VBO controller 442, as previously discussed. The VBO and/or VBO Light information 446 may be accessed by the module to retrieve VBO and/or VBO Light information 424 upon request to present real world item information to the user 406.

The VBO controller 442 may include processing rules 448. The processing rules 448 may relate to rules for creating, delivering, updating, and accessing the VBO and/or VBO Light. The VBO controller 442 processes and manages the VBO and VBO Light in accordance with the processing rules 448. The processing rules 448 may be predefined by the user 406 or other entity.

The VBO controller 442 may further include a module for management of VBO and/or VBO Light data 450. The module for management of VBO and/or VBO Light data 450 may perform various operations, such as accessing and transmitting VBO and/or VBO Light data to the user 406 via the communication device 404 or other device, monitoring and updating information of the VBO and/or VBO Light, and other like operations, as previously discussed.

The server virtual world mapping module 408 may also include avatar virtual world inventories 452. The avatar virtual world inventories 452 may include one or more avatar virtual world inventories associated with one or more users 406. Each inventory in the avatar virtual world inventories 452 may include one or more VBOs and/or VBO Lights associated with each respective user 406.

The server virtual world mapping module 408 may include a real world items information database 454. The real world items information database 454 includes detailed information about one or more real world items. The information about the real world items may be received from one or more sources, including store databases 458, retail store system 460, and/or other sources associated with the real world items.

The server virtual world mapping module 408 may further include a user ID database 456. The user ID database 456 may include information to identify one or more users 406. As previously discussed, the user ID may include the user's name, user's address, user identifier, IP address of the user, user logon information, or any other information associated with the user. The user ID database 456 may receive such information associated with users 406 from the store database 458, retail store system 460, and/or the user ID module 423 received from the communications device 404 associated with the users 406.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer implemented method for mapping transactions between a real world and a virtual world, comprising:
    receiving information associated with a first real world item and a second real world item at a virtual business object (VBO) controller on a computer system;
    receiving information associated with a user at the VBO controller;
    generating by the VBO controller a VBO comprising the information associated with the first real world item in response to receiving by the VBO controller a decision by the user to buy the first real world item, wherein the VBO is at least a virtual image of the first real world item;
    generating by the VBO controller a VBO light comprising the information associated with the second real world item in response to receiving at the VBO controller a decision by the user not to buy the second real world item, wherein the VBO light is at least a virtual image of the second real world item;
    transmitting one of the VBO and the VBO light to a VBO inventory database associated with the user based on the user's information; and
    displaying on a graphical user interface of a display the virtual world of an avatar's inventory associated with the user, wherein the graphical user interface displays one of the VBO and the VBO light.

2. The computer implemented method of claim 1, wherein the VBO light is generated by the VBO controller further in response to receiving a decision at the VBO controller to store information associated with the second real world item for later access.

3. The computer implemented method of claim 1, wherein receiving information associated with the first and second real world items at the VBO controller comprises receiving at the VBO controller the first and second real world items information from one of a virtual world store and a real world store sales, wherein the first and second real world item information comprises information about the first and second real world item needed to generate one of the VBO and the VBO light.

4. The computer implemented method of claim 1, wherein receiving information associated with the user at the VBO controller comprises receiving at the VBO controller the user's information from one of a communications device associated with the user and a real world store, wherein the user's information comprises information about the user needed to transmit one of the VBO and VBO light to the user's VBO inventory database.

5. The computer implemented method of claim 4, wherein the user's information comprises at least one of a name, an address, and an identification number.

6. The computer implemented method of claim 1, wherein one of the VBO and the VBO light generated by the VBO controller comprises at least one of:
    specifications of the first or second real world item;
    features of the first or second real world item;
    at least one manual associated with the first or second real world item;
    a sales receipt including details of the purchase of the first or second real world item;
    post-sale information of the first or second real world item;
    warranty information of the first or second real world item; and
    store information where the first or second real world item was purchased.

7. The computer implemented method of claim 1, further comprising providing access to information associated with one of the VBO and the VBO light in the user's VBO inventory database.

8. The computer implemented method of claim 1, wherein transmitting one of the VBO and the VBO light to the VBO inventory database associated with the user comprises transmitting one of the VBO and the VBO light to one of:
    the virtual world of the avatar's inventory associated with the user; and a mobile inventory; and
    a communications device of the user.

9. The computer implemented method of claim 1, further comprising:
    monitoring product and service information related to the first and second real world items to determine if any new updates exist; and
    updating in the user's VBO inventory database one of the VBO and the VBO light based on any new updates.

10. The computer implemented method of claim 1, wherein receiving information associated with the first and second real world items at the VBO controller comprises receiving an identification (ID) of the first or second real world item at the VBO controller.

11. The computer implemented method of claim 10, wherein receiving the identification (ID) of the first or second real world item at the VBO controller comprises at least one of:
  receiving the item ID captured through an image capturing device;
  receiving the item ID through the Internet; and
  receiving the item ID from a communication device of the user.

12. The computer implemented method of claim 10, further comprising determining the first or second real world items information based on the item ID.

13. The computer implemented method of claim 1, further comprising associating at least one store ID with the VBO light.

14. The computer implemented method of claim 10, further comprising:
  determining if a store which is associated with the item ID has any predefined settings for the user; and
  retrieving the predefined settings from a database in response to determining that the store has predefined settings for the user, wherein transmitting one of the VBO and the VBO light to the VBO inventory database comprises transmitting one of the VBO and the VBO light to the VBO inventory database in accordance with any predefined settings.

15. The computer implemented method of claim 1, further comprising:
  receiving a request to retrieve one of the VBO and the VBO light associated with the first and second real world items from the user's VBO inventory database;
  receiving information associated with the one of the VBO and the VBO light from the user's VBO inventory database; and
  presenting the information associated with the one of the VBO and the VBO light to the user.

16. The computer implemented method of claim 1, wherein generating one of the VBO and the VBO light comprises:
  receiving input data at the VBO controller;
  receiving item properties and extension points at the VBO controller; and
  generating one of a customized VBO, a customized VBO light, a VBO list, and an inventory VBO based on the input data at the VBO controller.

17. A system for mapping transactions between a real world and a virtual world, comprising:
  a processor; and
  a VBO controller operable on the processor, wherein the VBO controller comprises at least one module to:
  receive information associated with a first real world item and a second real world item;
  receive information associated with a user;
  generate a VBO comprising the information associated with the first real world item in response to a decision by, the user to buy the first real world item, wherein the VBO is at least a virtual image of the first real world item;
  generate a VBO light comprising the information associated with the second real world item in response to a decision by the user not to buy the second real world item, wherein the VBO light is at least a virtual image of the second real world item;
  transmit one of the VBO and the VBO light to a VBO inventory database associated with the user based on the user's information; and
  display on a graphical user interface of a display the virtual world of an avatar's inventory associated with the user, wherein the graphical user interface displays one of the VBO and the VBO light.

18. The system of claim 17, wherein the VBO controller comprises a module to provide access to the information associated with one of the VBO and the VBO light in the user's VBO inventory database.

19. The system of claim 17, wherein the VBO controller comprises at least one module to:
  receive a request to retrieve one of the VBO and the VBO light associated with the first and second real world items from the user's VBO inventory database;
  receive information associated with the one of the VBO and the VBO light from the user's VBO inventory database; and
  present the information associated with the one of the VBO and the VBO light to the user.

20. The system of claim 17, wherein one of the VBO and the VBO light generated by the VBO controller comprises at least one of:
  specifications of the first or second real world item;
  features of the first or second real world item;
  at least one manual associated with the first or second real world item;
  a sales receipt including details of the purchase of the first or second real world item;
  post-sale information of the first or second real world item;
  warranty information of the first or second real world item; and
  store information where the first or second real world item was purchased.

21. A non-transitory computer readable storage medium having computer usable program code embodied therewith for mapping transactions between a real world and a virtual world, the computer readable storage medium comprising:
  computer usable program code configured to receive information associated with a first real world item and a second real world item at a virtual business object (VBO) controller on a computer system;
  computer usable program code configured to receive information associated with a user at the VBO controller;
  computer usable program code configured to generate a VBO comprising the information associated with the first real world item in response to a decision by the user to buy the first real world item, wherein the VBO is at least a virtual image of the first real world item;
  computer usable program code configured to generate a VBO light comprising the information associated with second real world item in response to a decision by the user not to buy the second real world item, wherein the VBO light is at least a virtual image of the second real world item;
  computer usable program code configured to transmit one of the VBO and the VBO light to an inventory associated with the user based on the user's information; and
  computer usable program code configured to display on a graphical user interface of a display the virtual world of an avatar's inventory associated with the user, wherein the graphical user interface displays one of the VBO and the VBO light.

22. The non-transitory computer readable storage medium of claim 21, further comprising computer usable program code configured to provide access to the information associated with one of the VBO and the VBO light in the user's inventory.

23. The non-transitory computer readable storage medium of claim 21, wherein the computer usable program code configured to transmit one of the VBO and the VBO light to an inventory associated with the user comprises computer usable program code configured to transmit one of the VBO and the VBO light to one of:
- the virtual world of an avatar's inventory associated with the user; and
- a mobile inventory located on a communications device of the user.

24. The non-transitory computer readable storage medium of claim 21, further comprising:
- computer usable program code to receive a request to retrieve one of the VBO and the VBO light associated with the first or second real world item from the user's inventory;
- computer usable program code to receive information associated with the one of the VBO and the VBO light from the user's inventory; and
- computer usable program code to present the information associated with the one of the VBO and the VBO light to the user.

25. The non-transitory computer readable storage medium of claim 21,
- wherein the computer usable program code configured to receive information associated with the first and second real world items comprises computer usable program code configured to receive the first or second real world item information from one of a virtual world store and real world store sales system at the VBO controller; and
- wherein the computer usable program code configured to receive information associated with the user comprises computer usable program code configured to receive the user's information from one of a communications device associated with the user and real world store at the VBO controller.

* * * * *